United States Patent Office 2,987,548
Patented June 6, 1961

2,987,548
PREPARATION OF BENZYLAMINE

Philip S. Magee, San Rafael, Calif., assignor to California Research Corporation, San Francisco, Calif., a corporation of Delaware
No Drawing. Filed Aug. 22, 1958, Ser. No. 756,531
11 Claims. (Cl. 260—570.9)

This invention is concerned with a process for the preparation of benzylamine and, more particularly, with an improved ammonolysis of benzyl chloride.

The preparation of benzylamine by the ammonolysis of benzyl chloride has been broadly disclosed. For example, U.S. Patent No. 2,608,584 describes and claims a method of preparing benzylamine by reacting benzyl chloride and aqueous ammonia, the mol ratio of ammonia to benzyl chloride being about 20:1, at temperatures ranging from 5 to 50° C., and carrying out the reaction for a period of time ranging from 2 to 4 hours. Following reaction, excess sodium hydroxide is added and benzylamine is extracted with ethyl ether and purified. Yields of the order of 60% benzylamine are obtained by this method. Other similar methods for the preparation of benzylamine have been disclosed in the art, employing ethyl alcohol in conjunction with aqueous ammonia and benzyl chloride and following a procedure similar to the one outlined above.

The methods disclosed in the prior art are fraught with numerous difficulties, e.g., (1) large mol ratios of ammonia to benzyl chloride as high as 70:1 and higher, are required; (2) the time required to complete the reaction is lengthy; and (3) yields are low.

The difficulties experienced in earlier practice are due to excessive formation of undesirable side reaction products, including secondary dibenzyl and tertiary tribenzyl amine, with consequent reduction in yields of the primary product benzylamine. Initially, the reaction mixture contains ammonia and benzyl chloride. As the reaction progresses, benzylamine is formed. The following equations represent the desired reaction and the subsequent byproduct reactions:

(1) 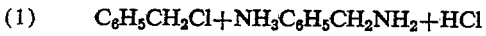 $C_6H_5CH_2Cl + NH_3 \rightarrow C_6H_5CH_2NH_2 + HCl$ (2) 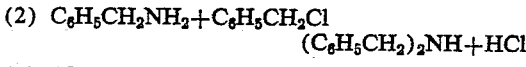 $C_6H_5CH_2NH_2 + C_6H_5CH_2Cl$
$\rightarrow (C_6H_5CH_2)_2NH + HCl$ (3) 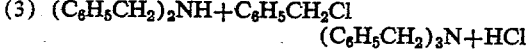 $(C_6H_5CH_2)_2NH + C_6H_5CH_2Cl$
$\rightarrow (C_6H_5CH_2)_3N + HCl$ The principal difficulty in the synthesis of primary amines lies in the fact that reactions 2 and 3 are considerably faster than reaction 1. The necessity for minimizing reactions 2 and 3 has heretofore been the reason for employing large excesses of ammonia, and these reactions explain the relatively low yields of benzylamine even when a large excess of ammonia is employed. My invention is designed to remedy this perplexing problem.

In its broadest terms, my invention involves a process for the preparation of benzylamine from benzyl chloride, which comprises reacting benzyl chloride with an excess of ammonia in water under ammonolysis conditions of temperature and pressure in the presence of a nonpolar solvent for the benzyl chloride, the said solvent being present in an amount of at least 20% of the total volume, whereby an organic phase enriched in benzyl chloride, and an aqueous phase enriched in benzylamine are formed.

In carrying out the process of the invention temperatures of reaction can vary within about the range 60° to 150° C., preferably 120° to 150° C. In general, it is preferable to employ as high a temperature as possible in order to increase the rate of reaction. Temperatures above 150° C., however, tend to increase side reactions forming the undesirable dibenzyl and tribenzyl amines. Moreover, in effecting the reaction, pressure is not critical and the reaction proceeds satisfactorily at autogenous pressure. In the ammonolysis, an excess of the ammonia over the benzyl chloride is employed, and amounts ranging upwards from about 15 mols of ammonia to one mol of benzyl chloride are satisfactory, a practical range residing within the limits of 25:1 to 35:1.

The concentration of ammonia in the aqueous solution can range from about 15 to 50% by weight, although I find that ranges of 25 to 40% by weight are more convenient.

I find that any nonpolar solvent for the benzyl chloride may be employed in the reaction mixture, provided that the solvent is inert and insoluble in aqueous ammonia, and takes no part in the reaction. Accordingly, both aliphatic and aromatic hydrocarbons, e.g., hexane, mixed hexanes, benzene, mixed xylenes, naphthalene, et cetera are suitable. I find that as a matter of economy and ease of operation, benzene and mixed hexanes are preferred.

The ratio of the solvent to aqueous ammonia by volume is at least sufficient to provide effectively for the formation of two phases and may range from 1:4 to as high as 10:1; and as a more narrow range, ratios varying from 2:3 to 3:2 may be cited. The rate of reaction depends on the temperature chosen within the specified range, with the limitation that the temperature does not greatly exceed 150° C. Thus, the reaction is fully completed in a period of time ranging from one-half to one and one-half hours at temperatures of 120 to 140° C.

Similarly uncritical is the method of separation or recovery of the benzylamine from the reaction product mixture. Thus, in one method, at the end of the reaction the aqueous phase and the organic solvent phase are separated, as by decantation and the like. The organic solvent phase is temporarily reserved and a strong base, such as sodium hydroxide or calcium hydroxide, is added to the aqueous phase in an amount sufficient to neutralize the hydrochloric acid formed, as determined from the amount of benzyl chloride first employed. In practice an excess amount of strong base, for example, up to 20%, is employed to help salt out the benzylamine and improve the extraction stage. While stirring or agitating the mixture, benzene is added to extract benzylamine. The benzene phase is again separated from the aqueous phase and combined with the portion first reserved. Benzene and benzylamine are then recovered by distillation. In commercial practice, recovered benzene can be recycled and the extraction carried out on a continuous basis. By another method, the whole reaction product mixture can be treated with strong base before separation of the phases. As indicated above, the phases are separated and benzylamine then recovered from the benzene phase.

For a fuller understanding of the nature of the invention, reference is now made to the following examples which illustrate the practice of the invention but are not to be construed in a limiting sense.

EXAMPLE 1

200 cc. of aqueous ammonia, 29% ammonia by weight, are mixed together with 300 cc. of benzene containing 12.7 grams of benzyl chloride in a glass ampule enclosed in a rocking bomb autoclave. Pentane is used externally to equalize the pressure inside the ampule. The temperature ranges from 135 to 145° C. during the reaction time of approximately 60 minutes. The benzylamine is recovered by separating the phases, adding NaOH to the aqueous phase and extracting with 150 cc. of portions of benzene. Four extractions are made. 8.8 grams of benzylamine are obtained by distillation which represents 82% of the theoretically expected amount.

EXAMPLE 2

This example is similar to Example 1, save that n-hexane is employed in the place of benzene. The benzylamine yield was 81% of theory.

EXAMPLE 3

30 cc. of aqueous NH$_3$, 29% ammonia by weight, are mixed together with 300 cc. of benzene containing 12.5 grams of benzyl chloride in a glass ampule enclosed in a rocking bomb autoclave. Pentane is used externally to equalize the pressure inside the ampulse. The temperature ranges from 135 to 145° C. during the reaction. After reaction, the benzylamine is then recovered from the reaction mixture according to the method described in Example 1. Good yields are obtained.

EXAMPLE 4

400 cc. of aqueous NH$_3$, 29% ammonia by weight, are mixed together with 100 cc. of benzene containing 4.25 grams of benzyl chloride in a glass ampule enclosed in a rocking bomb autoclave. Pentane is used externally to equalize the pressure inside the ampule. The temperature ranges from 60 to 70° C. during the reaction. After reaction, the benzylamine is then recovered from the reaction mixture according to the method described in Example 1. Good yields are obtained.

Table I contains additional examples wherein the two-phase systems are compared with a single phase aqueous ethanol-ammonia system. The comparison clearly demonstrates the process improvement.

Table I
AMMONOLYSIS OF BENZYL CHLORIDE

| Runs No. | Solvent,[1] Percent | Benzyl Chloride Molarity | Mole Ratio NH$_3$/ØCH$_2$Cl | Percent Yield of Benzylamine |
|---|---|---|---|---|
| 2 | 60 EtOH | 0.40 | 15 | 36-41 |
| 1 | 60 EtOH | 0.20 | 30 | 54 |
| 2 | 60 ØH | 0.40 | 15 | 65-71 |
| 6 | 60 ØH | 0.20 | 30 | 79-86 |
| 1 | 60 n-hexane | 0.40 | 15 | 77 |
| 1 | 60 n-hexane | 0.20 | 30 | 81 |

[1] 60% organic solvent+40% aqueous ammonia (29 weight % NH$_3$).

While the foregoing description has been limited to the preparation of benzylamine from benzyl chloride, the process is equally applicable to the formation of other amines from organic compounds containing a primary carbon atom having the general formula:

$$R-CH_2-X$$

wherein R represents any organic group, and X represents a halogen.

I claim:

1. The process for preparing benzylamine from benzyl chloride which comprises heating benzyl chloride at temperatures ranging from 60 to 150° C. with aqueous ammonia which contains from 15 to 50% ammonia by weight, the mol ratio of ammonia to benzyl chloride being at least 15:1, in the presence of a solvent for the said benzyl chloride said solvent being selected from the group consisting of normally liquid alkanes and aromatic hydrocarbons, the volume ratio of said solvent to the aqueous ammonia ranging from approximately 1:4 to 10:1, whereby an organic phase and an aqueous phase are formed, and recovering the benzylamine.

2. The process described in claim 1, wherein the temperature range is from 120 to 150° C.

3. The process described in claim 1, wherein the mol ratio of ammonia to benzyl chloride ranges from 25:1 to 35:1.

4. The process described in claim 1, wherein the volume ratio of said solvent to aqueous ammonia ranges from 2:3 to 3:2.

5. The process described in claim 1, wherein the ammonia concentration in the aqueous ammonia ranges from 25 to 40% by weight.

6. The process described in claim 1, wherein the solvent is selected from the group consisting of benzene and n-hexane.

7. The process described in claim 6, wherein the temperature range is from 120 to 150° C., the mol ratio of ammonia to benzyl chloride ranges from 25:1 to 35:1, the volume ratio of said solvent to aqueous ammonia ranges from about 2:3 to 3:2, and the ammonia concentration in the aqueous ammonia ranges from about 25 to 40% by weight.

8. The process for preparing benzylamine from benzyl chloride which comprises heating benzyl chloride at temperatures ranging from 60 to 150° C., with aqueous ammonia which contains from 15 to 50% ammonia by weight, the mol ratio of ammonia to benzyl chloride being at least 15:1, in the presence of a solvent for the said benzyl chloride, said solvent being selected from the group consisting of normally liquid alkanes and aromatic hydrocarbons, the volume ratio of said solvent to the aqueous ammonia ranging from approximately 1:4 to 10:1 whereby an organic phase and an aqueous phase are formed, separating the phases, adding a strong base to the aqueous phase in excess of the equivalent amount of benzyl chloride originally employed, to regenerate the benzylamine contained in the aqueous phase, and then recovering the benzylamine.

9. The process described in claim 8, wherein the temperature range is from 120 to 150° C., the mol ratio of ammonia to benzyl chloride ranges from 25:1 to 35:1, the solvent is selected from the group consisting of benzene and n-hexane, the volume ratio of said solvent to the aqueous ammonia ranges from about 2:3 to 3:2 and the ammonia concentration in the aqueous ammonia ranges from 25 to 40% by weight.

10. The process for preparing benzylamine from benzyl chloride which comprises heating benzyl chloride at temperatures ranging from 60 to 150° C. with aqueous ammonia which contains from 15 to 50% ammonia by weight, the mol ratio of ammonia to benzyl chloride being at least 15:1, in the presence of a solvent for the said benzyl chloride, said solvent being selected from the group consisting of normally liquid alkanes and aromatic hydrocarbons, the volume ratio of said solvent to the aqueous ammonia ranging from approximately 1:4 to 10:1, whereby an organic phase and an aqueous phase are formed, adding a strong base in excess of the equivalent amount of benzyl chloride originally employed to regenerate the benzylamine contained in the aqueous phase, and then recovering the benzylamine.

11. The process described in claim 10, wherein the temperature range is from 120 to 150° C., the mol ratio of ammonia to benzyl chloride ranges from 25:1 to 35:1, the solvent is selected from the group consisting of benzene and n-hexane, the volume ratio of said solvent to the aqueous ammonia ranges from about 2:3 to 3:2, and the ammonia concentration in the aqueous ammonia ranges from 25 to 40% by weight.

References Cited in the file of this patent

UNITED STATES PATENTS

| | | |
|---|---|---|
| 1,854,553 | Livingston | Apr. 19, 1932 |
| 2,334,782 | Martin | Nov. 23, 1943 |
| 2,519,440 | De Benneville et al. | Aug. 22, 1950 |
| 2,525,779 | De Benneville et al. | Oct. 17, 1950 |
| 2,540,155 | Wood | Feb. 6, 1951 |
| 2,640,080 | De Tar | May 26, 1953 |
| 2,783,277 | Hiltmann | Feb. 26, 1957 |
| 2,784,231 | Jones | Mar. 5, 1957 |